(12) United States Patent
Chen et al.

(10) Patent No.: US 7,495,896 B2
(45) Date of Patent: Feb. 24, 2009

(54) LATCHING MECHANISM WITH A PUCH BUTTON AND A PIVOT

(75) Inventors: Hsuan-Chen Chen, Taipei Hsien (TW); Yong Yue, Shenzhen (CN); Chien-Li Tsai, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 194 days.

(21) Appl. No.: 11/614,991

(22) Filed: Dec. 22, 2006

(65) Prior Publication Data

US 2007/0217140 A1    Sep. 20, 2007

(30) Foreign Application Priority Data

Mar. 15, 2006    (CN)    ................. 200620056546.X

(51) Int. Cl.
*H05K 7/12*    (2006.01)

(52) U.S. Cl. .................................................... 361/681

(58) Field of Classification Search ......... 361/679–686, 361/727; 439/6, 10, 347, 352, 355; 248/552; 312/223.1; 292/95
See application file for complete search history.

(56) References Cited

U.S. PATENT DOCUMENTS

| 6,115,239 | A | 9/2000 | Kim | |
|---|---|---|---|---|
| 6,563,699 | B1* | 5/2003 | Choi | 361/683 |
| 7,184,262 | B2* | 2/2007 | Hsu et al. | 361/683 |
| 7,374,438 | B2* | 5/2008 | Jiang et al. | 439/135 |
| 7,411,781 | B2* | 8/2008 | Yang | 361/681 |

* cited by examiner

*Primary Examiner*—Chandrika Prasad
(74) *Attorney, Agent, or Firm*—Wei Te Chung

(57) ABSTRACT

A latch mechanism is provided for locking a cover unit to a base unit. The latch mechanism includes a locking member slidably installed in the cover unit, a button movably attached to the cover unit, and a pivot member pivotably connected to the cover unit. The locking member includes a hook for engaging with the base unit, and an engaging portion formed thereon. The button forms a pushing portion. The pivot member is capable of being driven by the pushing portion of the button to rotate and in turn to slide the locking member for disengaging the hook from the base unit.

18 Claims, 5 Drawing Sheets

LATCHING MECHANISM WITH A PUCH BUTTON AND A PIVOT

BACKGROUND OF THE INVENTION

1. Field of the Invention

The present invention relates to a latch mechanism, and more particularly to a latch mechanism for a portable computer.

2. Description of related art

Typically, an electronic device, such as a portable computer, includes a cover unit and a base unit pivotally connected with the cover unit, and a latch mechanism is provided to lock the cover unit to the base unit.

As disclosed in U.S. Pat. No. 6,115,239, a latch mechanism for locking a cover unit to a base unit, includes a latch frame movably installed inside the cover unit, a plurality of latches are formed on the latch frame at predetermined intervals and one end portion of each latch protrudes from a front surface of the cover unit, and a slide knob is operatively connected to the latch frame for concurrently operating the latches. The latches are inserted into and locked by latch grooves formed at positions corresponding to the latches on an upper surface of the base unit. The latches are urged against the base unit by elastic forces applied by double springs mounted on two ends of the latch frame. However, to open the cover unit, the slide knob is slid to overcome the elastic forces of the springs to move the latch mechanism for disengaging from the base unit. The slide force depends on friction between the slide knob and fingers of an operator. It is laborious for an operator to provide enough force to move a slide knob.

What is needed, therefore, is a laborsaving latch mechanism.

SUMMARY OF THE INVENTION

A latch mechanism is provided for locking a cover unit to a base unit. The latch mechanism includes a locking member slidably installed in the cover unit, a button movably attached to the cover unit, and a pivot member pivotably connected to the cover unit. The locking member includes a hook for engaging with the base unit, and an engaging portion formed thereon. The button forms a pushing portion. The pivot member is capable of being driven by the pushing portion of the button to rotate and in turn to slide the locking member for disengaging the hook from the base unit.

Other advantages and novel features will become more apparent from the following detailed description of a preferred embodiment when taken in conjunction with the accompanying drawings, in which:

DETAILED DESCRIPTION OF THE INVENTION

Figure 1:
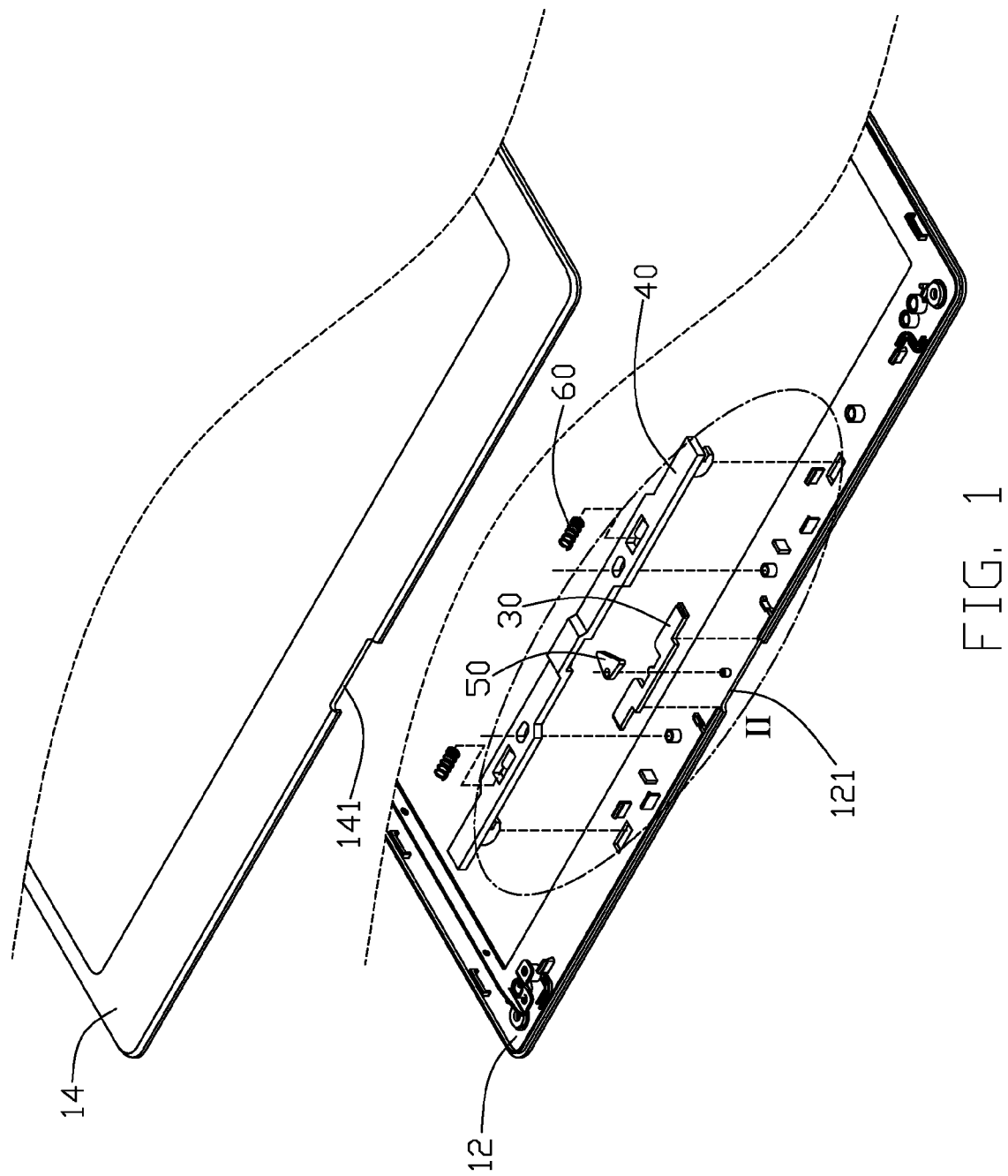
FIG. 1 is an exploded, isometric view of a latch mechanism with a cover unit in accordance with a preferred embodiment of the present invention, the cover unit including a first panel and a second panel.
Figure 5:
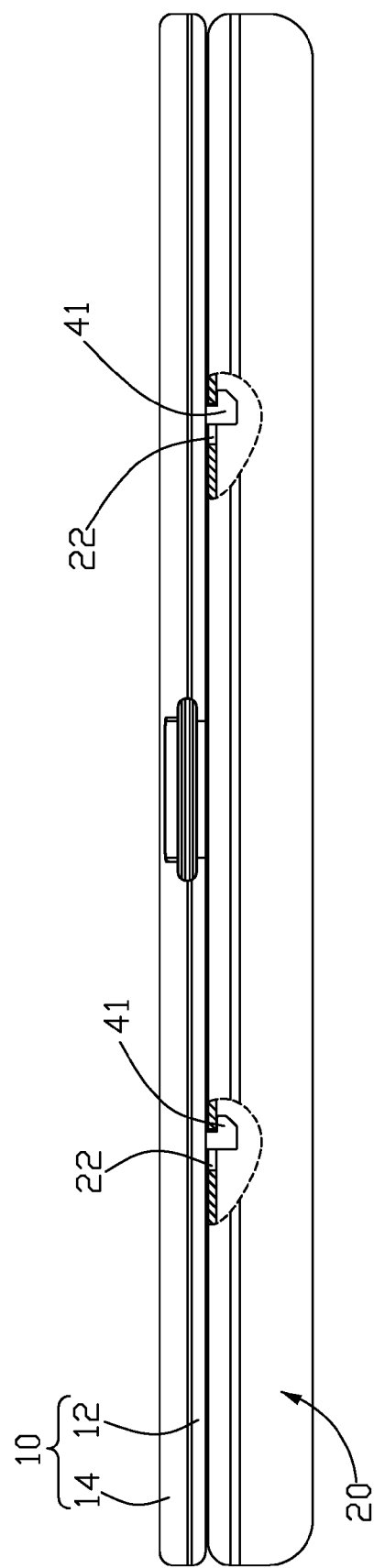
FIG. 5 is a schematic, assembled and part-sectioned view of FIG. 1 together with a base unit.

Referring to FIGS. 1 and 5, a latch mechanism is provided in accordance with a preferred embodiment of the present invention, for locking a cover unit 10 to a base unit 20 of an electronic device, such as a portable computer. The latch mechanism includes a button 30, a locking member 40, a pivot member 50, and two resilient members 60. In this embodiment, the resilient members 60 are springs. The base unit 20 defines a pair of latching slots 22.

Figure 2:
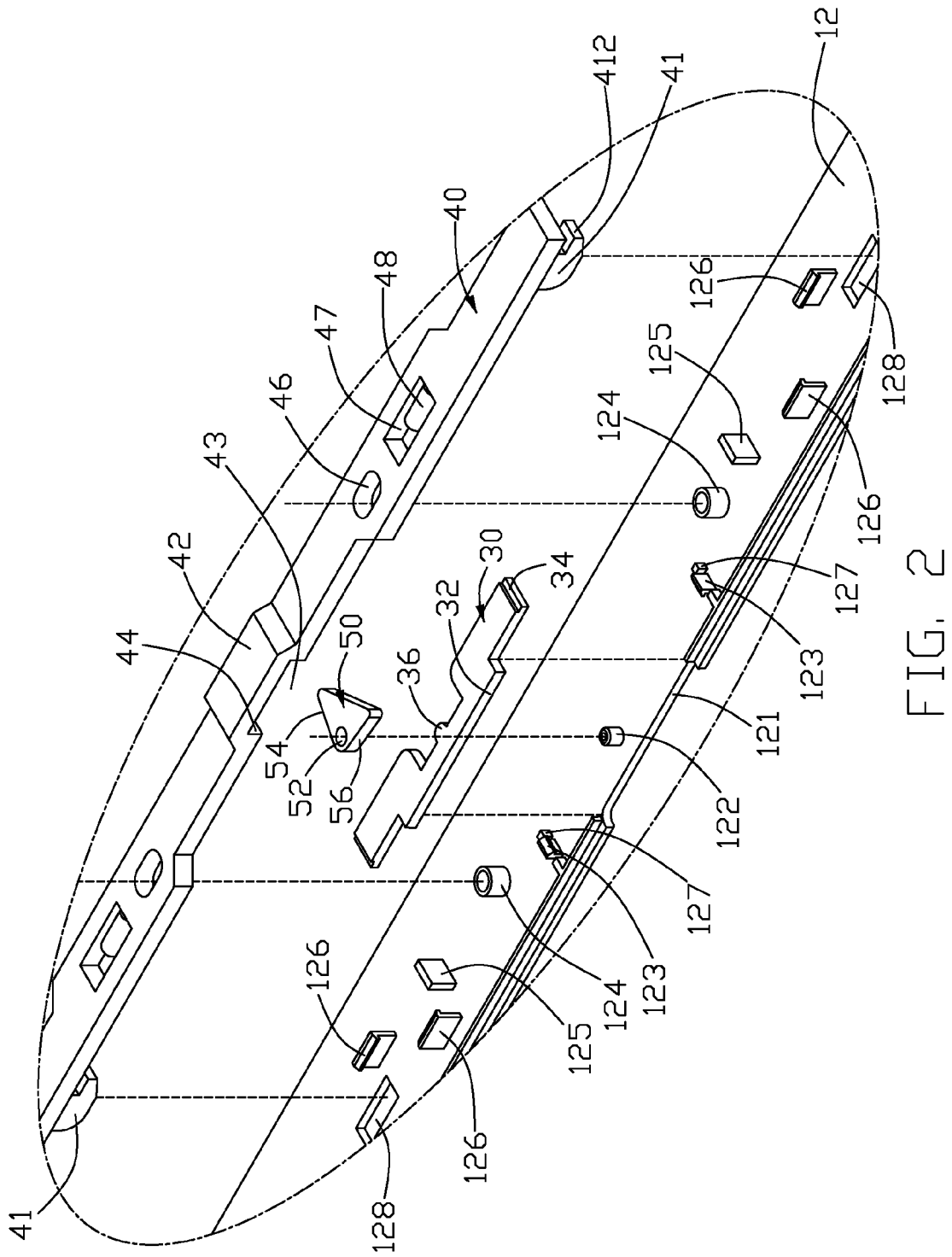
FIG. 2 is an enlarged view of a circled portion 11 of FIG. 1.

Referring also to FIG. 2, the cover unit 10 includes a first panel 12, and a second panel 14 having a cutout 141 defined therein. A recess 121 is defined inward in a middle of a front edge of the first panel 12. Two pairs of retainers 126 are formed on an inside surface of the first panel 12. Each one of each pair of retainers 126 has a hook facing to the hook of the other one. Two tabs 125 are formed on the inside surface of the first panel 12 between the retainers 126. Orientation of the tabs 125 are perpendicular to that of the retainers 126. Two columnar restricting portions 124 extend from the inside surface of the first panel 12 between the tabs 125. Two holders 123 are formed on the inside surface of the first panel 12 between the restricting portions 124 adjacent to the front edge of the first panel 12. A protrusion 127 protrudes from the inside surface of the first panel 12 beside each holder 123 away from the front edge of the first panel 12. A post 122 is formed perpendicularly on the inside surface of the first panel 12 between the holders 123 adjacent to the recess 121. The tabs 125 and the restricting portions 124 are arranged in a line and parallel to the front edge of the first panel 12. A slot 128 is defined in the first panel 12 beside each pair of the retainers 126.

The button 30 includes a body having a U-shaped cutout defined in a middle portion thereof, a press portion 32 protruding from an edge of the body, two sliding portions 34 formed from two ends of the body, and a pushing portion 36 extending into the cutout from the body.

The locking member 40 includes two hooks 41 depending from two ends thereof respectively, corresponding to the slots 128 of the first panel 12, two receiving slots 47 defined therein adjacent to the ends of the locking member 40 respectively, two elongated through holes 46 defined therein between the receiving slots 47 corresponding to the restricting portions 124 of the first panel 12, and an arched portion 42 formed from a middle section thereof. Each hook 41 has a hooking portion 412 at an end thereof. The two hooking portions 412 have the same orientation. A pole 48 extends horizontally from the locking member 40 into each receiving slot 47. A groove 43 is defined in the locking member 40 under the arched portion 42. An engaging portion 44 is formed on the locking member 40 bounding a left end of the groove 43.

The pivot member 50 is a generally triangle-shaped plate. A pivoting hole 52 is defined in a corner of the pivot member 50. The pivot member 50 forms a driving portion 54 and a driven portion 56 at two lateral surfaces sandwiching the corner.

Figure 3:
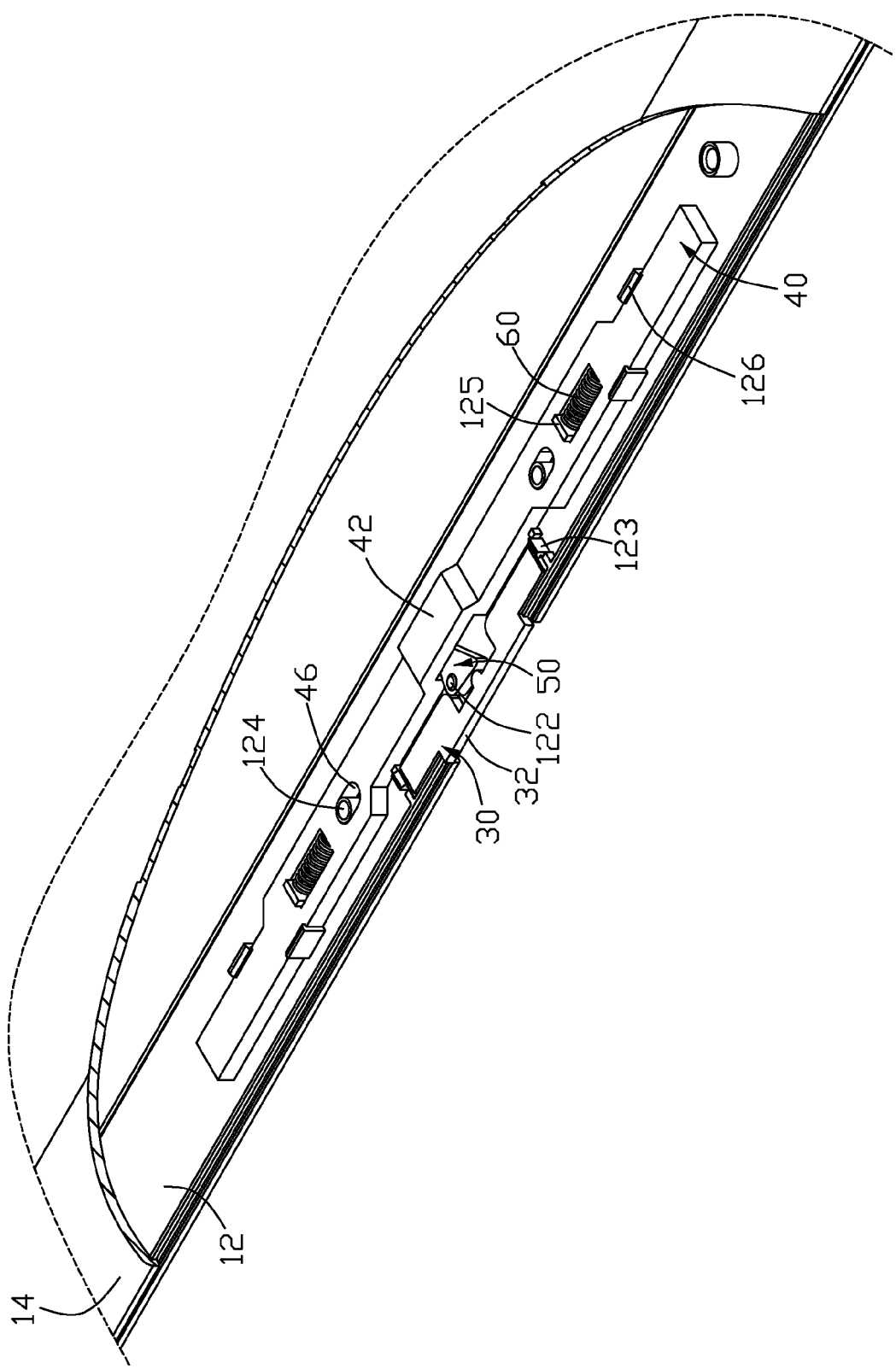
FIG. 3 is an enlarged, assembled view of FIG. 1 with a portion of the second panel of the cover unit being cut out.

Referring also to FIG. 3, in assembly, the button 30 is retained between the holders 123 in a left-and-right direction, and the sliding portions 34 of the button 30 are located under hooks of the holders 123. The press portion 32 of the button 30 is exposed from the recess 121 of the first panel 12. The protrusions 127 act to prevent further movement of the button 30. The pivot member 50 is pivotably connected to the first panel 12 via the post 122 of the first panel 12 pivotably received in the pivoting hole 52 of the pivot member 50. The resilient members 60 are placed around the poles 48 of the locking member 40 respectively. The locking member 40 is retained between the retainers 126 in a back-and-forth direction, and the hooks 41 of the locking member 40 extend through the slots 128 of the first panel 12 respectively. The tabs 125 of the first panel 12 extend into the receiving slots 47 of the locking member 40 respectively, thus one end of each resilient member 60 engages with the corresponding tab 125. The restricting portions 124 of the first panel 12 extend into the through holes 46 respectively for restricting the locking member 40 moving in the back-and-forth direction while guiding the locking member 40 moving in the left-and-right direction. A part of the pivot member 50 is under the arched portion 42 of the locking member 40.

Figure 4:
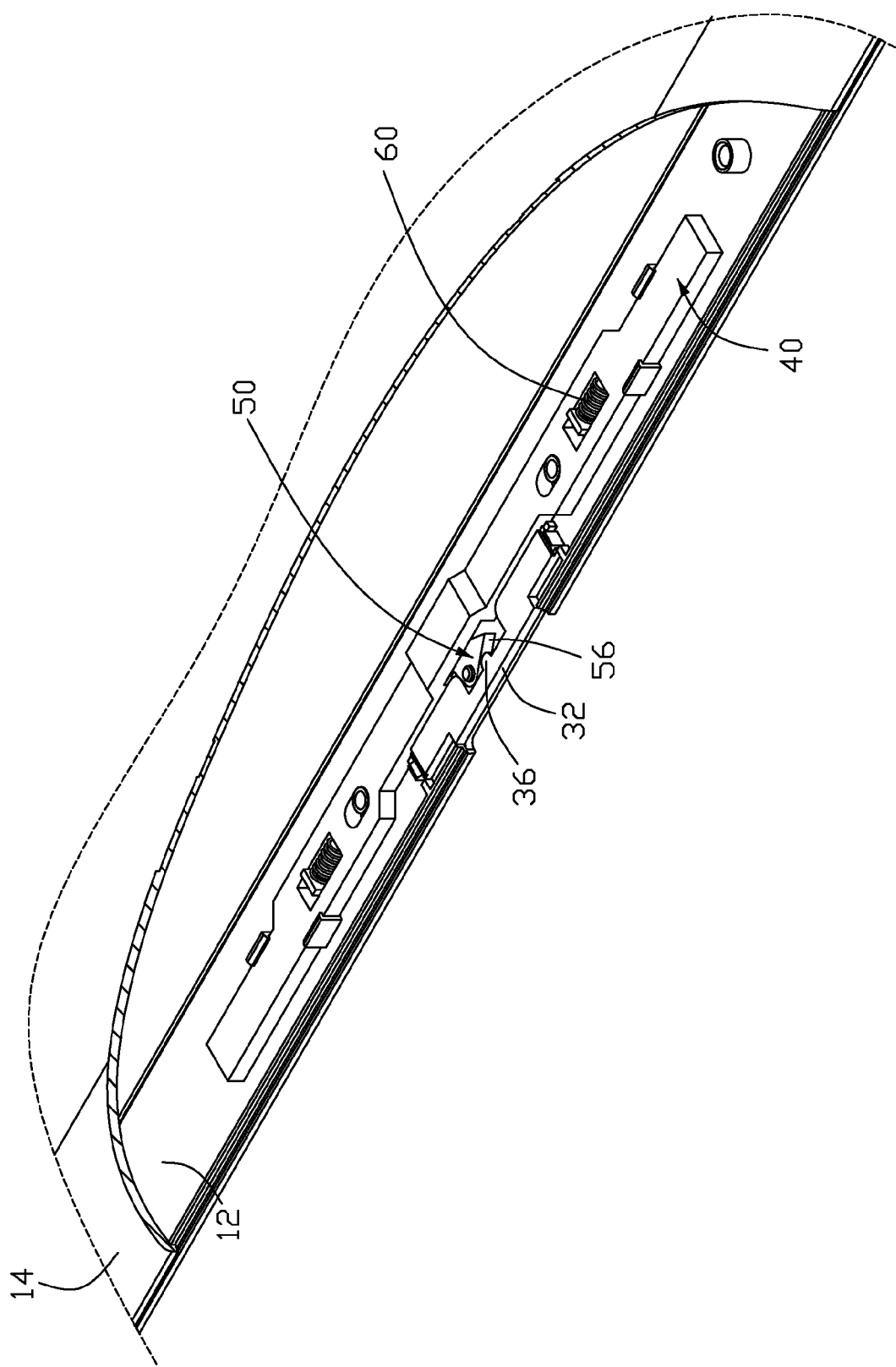
FIG. 4 is similar to FIG. 3, but showing another state of the latch mechanism.

Referring also to FIGS. 4 and 5, the second panel 14 holds a liquid crystal display (not shown) therein, and the first panel 12 is fixed to the second panel 14 to cover one side of the liquid crystal display, thereby the cover unit 10 is fully assembled. The cutout 141 of the second panel 14 is coupled with the recess 121 of the first panel 12.

The cover unit 10 is pivotably attached to the base unit 20. The cover unit 10 is pivoted to cover the base unit 20 when the electronic device is not in use. When bottom surfaces of the hooking portions 412 of the hooks 41 abut against portions adjoining the latching slots 22 of the base unit 20 respectively, the cover unit 10 is pressed downward, the portions of the base unit 20 drive the locking member 40 to slide leftward by urging against the hooks 412 of the locking member 40. The resilient members 60 are compressed by the tabs 125 of the first panel 12 of the cover 10 respectively. When the hooking portions 412 of the hooks 41 entirely enter the latching slots 22 of the base unit 20 respectively, the resilient members 60 rebound to push the locking member 40 to slide rightward, the hooking portions 412 of the hooks 41 engage with the portions of the base unit 20 adjoining the latching slots 22. Thus, the cover unit 10 is locked to the base unit 20.

Referring further to FIG. 4, to unlock the cover unit 10 from the base unit 20, the press portion 32 of the button 30 is pressed to move the button 30 backward along the holders 123 of the first panel 12. The pushing portion 36 of the button 30 pushes the driven portion 56 of the pivot member 50 inward to pivot the pivot member 50, thus the driving portion 54 of the pivot member 50 urges against the engaging portion 44 of the locking member 40, the locking member 40 is therefore pushed to slide leftward, and compresses the resilient member 60. When the hooking portions 412 of the hooks 41 move to align with the corresponding latching slots 22 and disengage from the portions adjoining the latching slots 22 respectively, the cover unit 10 is ready to be pivoted open.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A latch mechanism for locking a cover unit to a base unit, the latch mechanism comprising:
   a locking member configured for being installed in the cover unit and slidable in a first direction, the locking member comprising a hook configured for engaging with the base unit, an engaging portion formed on the locking member;
   a button configured for being fixed to the cover unit and movable in a second direction generally perpendicular to the first direction, the button comprising a pushing portion; and
   a pivot member configured for being pivotably connected to the cover unit, the pivot member capable of being driven by the pushing portion of the button to push the locking member at the engaging portion to slide in the first direction for disengaging the hook from the base unit.

2. The latch mechanism as claimed in claim 1, wherein the pivot member comprises a driving portion engagable with the engaging portion of the locking member and a driven portion engagable with the pushing portion of the button, and the driving portion and the driven portion are arranged at two unparallel lateral surfaces of the pivot member.

3. The latch mechanism as claimed in claim 2, wherein the pivot member comprises a pivoting hole defined in a corner sandwiched between the driving portion and the driven portion, a post is configured on the cover unit for pivotably attaching the pivot member to the cover unit.

4. The latch mechanism as claimed in claim 1, wherein the locking member is spring-loaded for restoring the locking member.

5. An electronic device comprising:
   a base unit;
   a cover unit pivotably attached to the base unit, the cover unit comprising a first panel and a second panel;
   a locking member attached between the first and second panels and movable between a first position in which the locking member engages with the base unit to thereby lock the cover unit with the base unit and a second position in which the locking member disengages with the base thereby unlocking the cover unit from the base unit;
   a pivot member connected to the cover unit and rotatable around an axis perpendicular to the cover unit; and
   a button attached between the first and the second panels and movable in a direction perpendicular to the axis, the button capable of being manipulated to drive the pivot member to rotate and the pivot member in turn driving the locking member to the second position.

6. The electronic device as claimed in claim 5, wherein the base unit defines a latching slot therein, and the locking member comprises a hook for extending through the latching slot and engaging with the base unit.

7. The electronic device as claimed in claim 5, wherein the locking member defines a groove therein, an engaging portion is formed adjoining the groove, and the pivot member comprises a driving portion at least partially received in the groove for pushing the engaging portion to move the locking member from the first position to the second position.

8. The electronic device as claimed in claim 5, wherein a post is formed perpendicularly on the first panel, the pivot member defines a pivoting hole for receiving the post and pivoting around the post.

9. The electronic device as claimed in claim 5, further comprising a resilient member placed between the locking member and the first panel for restoring the locking member.

10. The electronic device as claimed in claim 6, wherein an elongated through hole is defined in the locking member, a restricting portion is formed on the first panel and extends into the elongated through hole for guiding movement of the locking member between the first and second positions and restricting movement of the locking member in said direction.

11. The electronic device as claimed in claim 5, wherein a pair of retainers is configured on the first panel for retaining the locking member to the first panel in the back-and-forth direction.

12. The electronic device as claimed in claim 5, wherein two holders are formed from the first panel for movably positioning the button to the first panel.

13. The electronic device as claimed in claim 5, wherein the cover unit comprises a recess defined inward in a middle portion of a front edge thereof, and the button comprises a press portion exposed from the recess.

14. An electronic device comprising:
a base unit;
a cover unit having a first side fixed to the base unit and a second side opposing to the first side, the cover unit comprising a first panel and a second panel fixed together;
a locking member attached between the first and second panels configured for detachably locking the second side of the cover unit with the base unit, the locking member being movable relative to the cover unit in a left-and-right direction between a first position in which the locking member engages with the base unit to thereby lock the second side of the cover unit with the base unit and a second position in which the locking member is disengaged from the base and the second side of the cover unit is unlocked with the base unit;
a button attached to one of the cover unit and the base unit and being slidable in a back-and-forth direction; and
a pivot member rotatably attached to the cover unit and engagable with the locking member and the button for transferring movement of the button to the locking member, wherein the button is capable of being manipulated to slide in the back-and-forth direction and drive the pivot member to rotate and the pivot member in turn drives the locking member to slide from the first position to the second position in the left-and-right direction.

15. The electronic device as claimed in claim 14, wherein the pivot member is rotatably attached to the cover unit via a post which is connected between the pivot member and the cover unit, the pivot member being rotatable about the post.

16. The electronic device as claimed in claim 14, wherein the pivot member comprises a driving portion engagable with the locking member and a driven portion engagable with the button, and the driving portion and the driven portion are arranged at two unparallel lateral surfaces of the pivot member.

17. The electronic device as claimed in claim 16, wherein the button comprises a protrusion extending therefrom, the protrusion being slidable along one of the lateral surfaces of the pivot member at which the driven portion is arranged to drive the pivot member to rotate when the button is manipulated to slide in the back-and-forth direction.

18. The electronic device as claimed in claim 14, wherein the locking member defines a receiving slot, a tab extending from one of the first and second panels to be received in the receiving slot, a resilient member being compressed between the tab and the locking member in the receiving slot for urging the locking member to the first position.

* * * * *